Aug. 4, 1931. R. B. BENNETT 1,816,889
FISHING REEL
Filed April 5, 1929
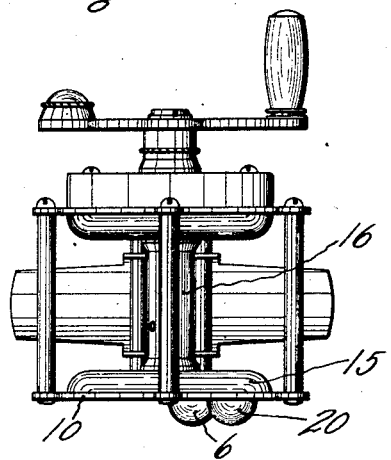
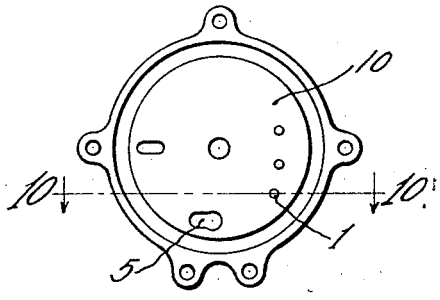
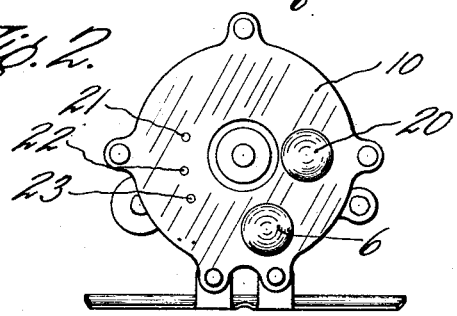
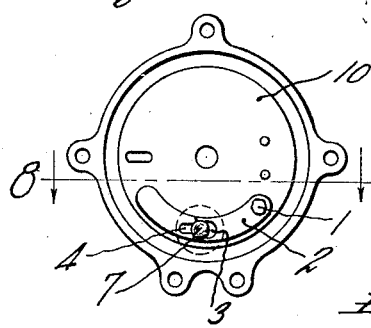
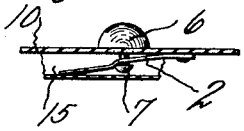
INVENTOR.
Raymond B. Bennett
BY Chapin & Neal
ATTORNEYS.

Patented Aug. 4, 1931

1,816,889

UNITED STATES PATENT OFFICE

RAYMOND B. BENNETT, OF MONTAGUE CITY, MASSACHUSETTS, ASSIGNOR TO MONTAGUE ROD & REEL COMPANY, OF MONTAGUE CITY, MASSACHUSETTS, A CORPORATION OF MASSACHUSETTS

FISHING REEL

Application filed April 5, 1929. Serial No. 352,848.

This invention relates to an improved fishing reel. It is a specific invention directed to improved construction for creating a drag or steady friction on the spool of the reel. The improvement renders a fishing reel in form for lower cost production and in some respects for better or more certain operation in that the improved parts are made better for their function. Another feature of the invention is in the improved way of fastening associated parts on the side plate of the reel. The details of the improvement will be best understood from the accompanying drawings, in which—

Fig. 1 is a top view of a fishing reel of the type to which my invention is applied;

Fig. 2 is a side view remote from the handle;

Fig. 3 is a face view of the side plate shown in Fig. 2 but on the inside with all parts removed from the face;

Fig. 4 is a face view of drag spring before assembly on the end plate;

Fig. 5 is a top edge view of Fig. 4;

Fig. 6 is a view of the button to manipulate the drag spring through the side plate;

Fig. 7 is a view of the side plate with drag spring and button assembled on it;

Fig. 8 is a view taken on line 8—8 of Fig. 7 showing the drag spring in contact with flange of the reel spool;

Fig. 9 is taken on same line 8—8 of Fig. 7 and shows the drag spring out of contact with the flange of said spool; and Fig. 10 is a detail section on line 10—10 of Fig. 3.

To carry out my invention in its preferred form an integral rivet pin 1 is extruded from the plane of the side plate 10 so as to form the material of the rivet from the material of the side plate. The latter is usually brass and my procedure is to start the punching of a hole in the side plate from the side opposite to where the rivet pin is desired and to stop the punching operation as by bottoming the extrusion in a die before it has lost its effective integral association with the side plate. This is like extruding or pressing out a boss from the material of the side plate.

The drag spring 2 is now placed on the inside face of the plate 10 so that the enlarged end 3 of the slot 4 is in complete registration with the slot 5 through plate 10. The button head 6 is now placed against the outside of plate 10 so that its shank extends through the slot 5 and the smaller head 7 of the button extends through the enlarged end 3 of the slot 4.

In this position of the parts the hole 8 in drag spring 2 is not in position to receive the rivet pin 1 for which it is provided. So the drag spring 2 after the parts have been assembled as described must be shifted until the enlarged end 3 of slot 4 is offset circumferentially from the enlarged end of slot 5 through plate 10, and the enlarged ends of slots 4 and 5 which were in registration for the passage of button head 7 are no longer in such registration. This shifting is possible since the shank of the button can ride in slot 4 and the edges of head 7 can ride over the cam surface 9 of spring 2.

With the slots 5 and 4 offset as described, hole 8 receives rivet pin 1 and the latter is headed over to hold the parts on the side plate 10. The button 6 may be shifted from one end to the other of slot 5 to apply and remove the spring friction to the spool. Since the enlarged ends of slots 4 and 5 are offset in the final assembly, the head 7 cannot again pass through the slots so the button 6 is locked in assembled position and cannot fall out.

Now it will be clear from Fig. 8 that spring 2 riveted at one end is designed so as to normally have its free end extend away from side plate 10. In such position it bears against the outer face of the flange 15 on spool 16 of the fishing reel shown in Fig. 1 so that it creates a drag or steady friction as the line is drawn out. But when the button 6 is shifted in slot 5 from the position nearest rivet pin 1 to the end remote from the pivot, the shoulders of the inner head 7 of the button will ride over cam surface 9 of spring 2 and pull the free end of the spring toward plate 10 and out of friction contact with flange 15 on the spool (see Fig. 9). It is obvious that spring 2 will be held in operative drag (or friction) position or out of such position according to the position of the button head 6 observable and operable from the outside of the plate 10.

In Fig. 2 the button head 20 indicates the means for connecting and disconnecting the "click" in the fishing reel. The recesses 21, 22, and 23 indicate rivet pin extrusions from the outside of plate 10 to the interior thereof, similar to the rivet pin 1 described. On such additional rivets other usual parts of the reel mechanism (not shown) are mounted, having to do with the click mechanism not necessary to describe here.

Heretofore the drag or friction-creating means in the fishing reel construction has been constructed by providing a rivet for the spring made separately from the side plate. The button has been made with a shank that was headed over after insertion through the side plate and assembly with the spring. In the actual manufacture of the parts the improved means by which the rivet is made by extrusion from the side plate and the button is made with the smaller head 7 turned up when the button is made and before assembly and then assembling as described, according to my invention, are all found to be of substantial advantage. Not only is the extra work and skill in making the parts complete at the time of fitting them together according to prior practice avoided, but the actual fitting and relation of the parts are standardized so they can affect the reel just as desired, without any large dependence as heretofore on the human factor in the final assembly. As only one example: under the old practice if the shank of the button were headed over too much after assembly with the spring on the side plate, the drag spring would be drawn down too far to be effective in the reel, and such heading operation might be different with one workman than another, or even with the same workman at different times in the day's work. Such possibilities are avoided by my improvements under which all the workman has to do is to assemble the parts and head over an integral rivet 1 at a point where no delicate work is required. The parts are thus bound to work as intended, which is important in fishing reels:

What I claim is:

1. In a fishing reel of the type described an end plate having an integral rivet extruded to its inside face, a leaf drag spring bound at one end to the plate by such a rivet headed over against the spring and with the other end of the spring tending to lie away from the plate to create a steady friction on the flange of the reel spool, a button mounted to slide in a slot in the side plate and having an inner head with a shank running through a slot in said spring, said slot having an enlargement which will admit said head when said enlargement is in registration with the slot in the side plate but which enlargement is offset from the slot in the side plate when the spring, the button and the side plate are finally assembled.

2. In a fishing reel a side plate having a slot, a button whose shank rides in the slot and with an inner head that can pass through the slot, a leaf drag spring fastened at one end and tending to extend away from the plate, a slot in said spring having an enlarged end to pass the inner head of the button during the assembly of the parts with the button so that its flanges will be in line to overlie the edges of the spring slot as the button is shifted in the side plate, said spring being positioned when attached to the plate by its end fastening to prevent the registration of the enlarged end of its slot with the slot in the side plate whereby the button is prevented from falling out of its operative position after assembly of the parts and the final fastening of the drag spring.

In testimony whereof I have affixed my signature.

RAYMOND B. BENNETT.